United States Patent [19]
Beker et al.

[11] Patent Number: 4,890,323
[45] Date of Patent: Dec. 26, 1989

[54] DATA COMMUNICATION SYSTEMS AND METHODS

[75] Inventors: Henry J. Beker, Wokingham; Paul W. Halliden, Salisbury; John M. K. Friend, Purlieu, all of England

[73] Assignee: Racal-Guardata Limited, Middlesex, England

[21] Appl. No.: 52,257

[22] Filed: May 20, 1987

[30] Foreign Application Priority Data

May 22, 1986 [GB] United Kingdom ................. 8612519

[51] Int. Cl.$^4$ ............................................. H04K 1/00
[52] U.S. Cl. ....................................... 380/25; 380/29; 380/49
[58] Field of Search ................................... 380/23–25, 380/29, 49, 50; 340/825.31, 825.34, 825.52; 364/200, 900

[56] References Cited

U.S. PATENT DOCUMENTS

| 4,302,810 | 11/1981 | Bouricius et al. | 380/24 |
| 4,315,101 | 2/1982 | Atalla | 380/24 |
| 4,453,074 | 6/1984 | Weinstein | 380/23 |
| 4,500,750 | 2/1985 | Elander et al. | 380/24 X |
| 4,503,287 | 3/1985 | Morris et al. | 380/45 |
| 4,549,075 | 10/1985 | Saada et al. | 380/25 |
| 4,575,621 | 3/1986 | Dreifus | 380/23 X |
| 4,596,898 | 6/1986 | Pemmaraju | 380/45 |
| 4,601,011 | 7/1986 | Grynberg | 380/23 |
| 4,652,698 | 3/1987 | Hale et al. | 380/24 |
| 4,656,474 | 4/1987 | Mollier et al. | 380/23 |
| 4,665,396 | 5/1987 | Dieleman | 380/23 |
| 4,677,670 | 6/1987 | Henderson, Jr. | 380/23 |
| 4,723,284 | 2/1988 | Munck et al. | 380/25 |

FOREIGN PATENT DOCUMENTS 0043027 6/1981 European Pat. Off. .
0140388 1/1984 European Pat. Off. .
0168667 6/1985 European Pat. Off. .

Primary Examiner—Stephen C. Buczinski
Assistant Examiner—Bernarr Earl Gregory
Attorney, Agent, or Firm—Jerry A. Miller

[57] ABSTRACT

In order to improve the security of message transmission from a terminal apparatus in an electronic banking or other data communications system a check-sum or MAC is computed from the data within the message in dependence upon a cryptographic key. This MAC is issued as a "challenge" to the user who is also equipped with a separate portable token for computing a "response" in dependence upon a second cryptographic key which is unique to his token. This "response" is then entered into the terminal and appended to the message as its authentication code before transmission. A recipient of the message and authentication code equipped with the same cryptographic keys can therefore check both the contents of the message and the correct identity of the sender by computing an expected authentication code from the received message and comparing it with the code received.

8 Claims, 1 Drawing Sheet

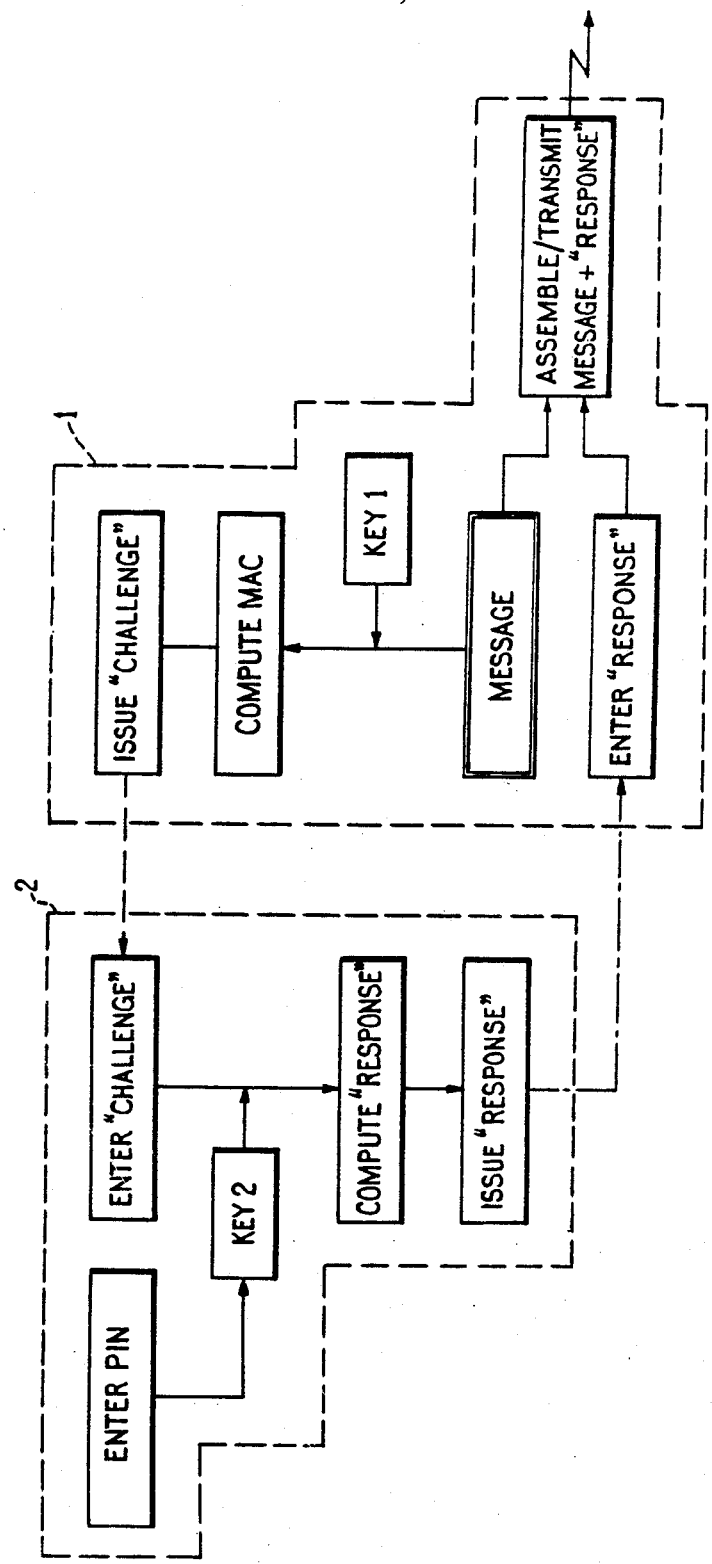

DATA COMMUNICATION SYSTEMS AND METHODS

This invention relates to communication systems and particularly to systems for data communications. More specifically, the invention is concerned with improving the security of transactions flowing across a communications network—a factor of ever increasing importance particularly in the field of electronic funds transfer and for other systems carrying financially or commercially sensitive information.

In many circumstances it is important not only to protect the messages in such a system from passive interception but also, and often of greater importance, to be able to detect any active attack against messages. An active attack may take the form of an interceptor tampering with the message: altering it, adding information, removing information and so on. While it is almost impossible to prevent an active attack there are many mechanisms which aim to ensure that such an attack will be detected and hence can be rendered harmless. Known techniques to allow detection and thus audit take many forms of which the most common are normally cryptographically based and depend upon the generation, before transmission of the message, of a check-sum which is then appended to the message. The theory underlying this approach is that if a would-be fraudster changes any part of the message in any way then the check-sum will no longer be correct and thus the recipient of such a message can compute, for himself, the expected check-sum, compare it with that received in the message, and if they disagree will know that the message has been altered in some way. If on the other hand the expected and received check-sums agree then he knows with a high probability that the message has not been altered. This probability is dependent upon the amount of information in the check-sum—ideally the more information within it (i.e. the longer it is) the lower the probability of an undetected alteration.

Many such systems exist. Some of these depend only upon an algorithmic check-sum, often called a test-key or authentication parameter. In this case the security level is often relatively low since someone attacking the system with knowledge of this algorithm may be aware of ways in which he can alter the message without affecting the check-sum computation. A trivial example of this is as follows: suppose the check-sum on a numeric message is computed solely as the modulo-10 sum of all digits in the message. An attack upon the system which involves altering only the order of the digits in the message would not be detected by the check-sum.

A normally more secure technique involves the use of a cryptographic check-sum, often termed a message authentication code (MAC). In this case the check-sum is dependent not only upon the cryptographic algorithm but also a cryptographic key. An example of this, in common usage, is the system described within American National Standards Institute (ANSI) standards X9.9 and X9.19. Within these standards the cryptographic algorithm is the Data Encryption Algorithm as described in FIPS 46 and ANSI X3.92. The cryptographic key is a 56-bit DEA key. The check-sum or MAC is a 32-bit value appended to the message. It is currently generally accepted that provided the cryptographic key is kept secret then any alteration to the message can be detected by the recipient with a probability of 0.9999999998 (i.e. $1-\frac{1}{2}^{32}$).

Within some communications systems protection of messages in the above manner is considered adequate. However, there do also exist many systems within which it is important not only to detect any alterations to the message, and thus be able to provide alarms and an audit system of these, but also to confirm the identity of the person or group of persons from which such a message originated; this is in some sense equivalent to requiring a verifiable "signature" on the message. It is an aim of the present invention to provide a system within which these two functions can be integrated together in a convenient manner and with a potentially very high level of security.

Accordingly in one aspect the invention resides in a method of secure message transmission from a terminal apparatus to a remote receiving station in a communications system, which involves appending to a message to be transmitted an authentication code the value of which depends upon both the information in the message and information representing the identity of the sender, and wherein the authentication code is produced by a method comprising the steps of: computing within the terminal apparatus a first code the value of which depends upon the information within the message; issuing that code to the sender; computing a second code from said first code and information representing the identity of the sender, within a token assigned to the sender and which can be actuated to perform this computation only upon the recognition of a PIN (Personal identification number) or other correct input indicative of the authority of the sender (e.g. a fingerprint or other biometric parameter); and entering said second code into the terminal apparatus, that code or a derivative thereof constituting the authentication code.

In use of a method according to the invention the genuineness of the message as received at the receiving station can be checked—both as to its contents and the identity of its purported sender—by comparing the received authentication code with the "expected" code computed from the received message at that station. Most preferably, the computation of the aforesaid first and second codes prior to transmission of the message is dependent upon respective cryptographic keys held in the terminal apparatus and the sender's token, knowledge of or access to both of which would therefore be required in order to subvert the system. The sender's token may conveniently be in the form of a small portable unit completely structurally separate from the terminal apparatus and akin to a hand-held calculator, comprising a keypad for entry of the sender's PIN (if that is the form of authorization input employed) and the first (message-dependent) code issued by the terminal, and a display to indicate the second code which the token computes from the first code and the sender's identity information. The latter is itself preferably represented by a unique key embedded in the token, under which the cryptographic computation takes place. In particular, the senders' tokens for use in a method according to the invention may thus in themselves be constructionally and functionally equivalent to the users' password generators in a so-called "dynamic password" access-control system, such as that marketed by Racal-Guardata Limited under the trade mark Watchword.

An example of a communications system operating a secure message-transmission technique in accordance with the invention will now be more particularly described with reference to the accompanying drawing, which is a combined schematic block diagram and flow chart of the process of generating a message authentication code at a user's terminal station. For the purposes of this description it will be assumed that this is part of a corporate banking network where the bank is accepting payments, transfers and the like into a central computer from its customers.

Within his terminal 1 the bank customer compiles a data message as a series of binary digits. The first step in the generation of the ultimate authentication code to append to this message is to compute an initial checksum or MAC from the information in the message using a cryptographic algorithm and a cryptographic key—indicated as KEY 1 in the drawing—supplied to the customer by the bank and held within his terminal in a tamper-resistant module. The computation of this MAC may proceed in accordance with the Data Encryption Standard (DES) as described above in relation to the prior art, but in this case the MAC is not appended directly to the message. Instead, it is issued, normally in a modified form, to the user as a "challenge", for example in the form of a decimal number displayed on the terminal's VDU screen.

To respond to this "challenge" each user is also supplied with a personal token 2 in the form of a completely portable, hand-held device similar to a "dynamic password" generator as indicated above. The user enters into this token the "challenge" number displayed by the terminal and the token computes from this a "response" number which is issued in decimal form on the token's own display. This computation is made, again preferably in accordance with the DES, using a cryptographic algorithm and a second cryptographic key—indicated as KEY 2 in the drawing—which is embedded in the token in tamper-resistant form and is unique for each individual user's token. Thus this "response" number depends both upon the information contained in the original message (because it is derived from the initial MAC) and upon the identity of the user (as represented by the particular cryptographic key used for the computation). Before the token can be operated to make this computation, however, it must first have the appropriate user's personal identification number (PIN) entered into it. This PIN is used only to control access to the operation of the token, not as the means of identifying the user in the actual computation, and therefore it need not be known by any other part of the system. It can readily be arranged, therefore, for each user to select (and re-select) his PIN at will and for individual PINs to be retained in utmost secrecy.

The user then enters the computed "response" number into the terminal 1, where it is assembled with the original message, in binary form, as the final authentication code, and this message plus "response" is transmitted over the communications network to the bank. At the receiving station the bank holds cryptographic keys corresponding to KEYS 1 and 2, themselves encrypted under a master key contained in a physically secure enclosure. Using these keys the recipient can compute the authentication code which should correspond to the received message and compare it with the received code, thus both checking for any unauthorized interference with the contents of the message and confirming the identity of the purported sender.

At the receiving end, a system as described above could only be compromised while being set up or through breach of the enclosure which holds the master key—which can be expected to be highly secure. At the user level it can only be compromised via an attack upon both the user's cryptographic terminal facility (holding KEY 1) and his token (holding KEY 2). A stolen token will be of no use to a potential fraudster without also having both knowledge of the rightful user's PIN and access to a corresponding terminal or knowledge of its KEY 1.

From the foregoing, it will be apparent that this system provides a coded signal appended to the message which is in the form of a "signature" corresponding to the identity of the user but which also depends on the message itself. Thus this signal cannot successfully be removed from the message and appended to another message since it will no longer be appropriate and any such unauthorized action would be detected by the recipient.

Even if an unauthorized person were able to discover the cryptogaphic key used in a terminal for computing the initial MAC (KEY 1), this would not be sufficient to penetrate the system since any alteration to a message and its corresponding MAC requires corresponding alteration of the "response" which cannot successfully be accomplished without access to or knowledge of the rightful user's KEY 2. In view of this it would even be possible for the bank to give all its customers the same cryptographic key for computing the initial MAC and yet still be assured of a high level of security by virtue of the "response" confirmation.

In a modification, the initial MAC computed at the terminal may be appended to the transmitted message as well as the "response" number computed in the token. This may be advantageous as it enables the correctness of the actual message to be checked at the receiving station by reference to the MAC by someone who does not need to have any information about the sender. The sender's identity can be separately checked using the "response" number. This also means that it is possible to arrange for the sender's identity to be "notarized" by an independent party equipped with the relevant sender's token's cryptographic key (KEY 2), a process which may be required e.g. in dealing networks as a mechanism to guarantee the veracity of the "signatures" on transmitted messages and to avoid the falsification of "signatures" by recipients..

We claim:

1. A method of secure message transmission from a terminal apparatus to a remote receiving station in a communications system, which involves appending to a message to be transmitted an authentication code comprising substantially fewer data bits than in the message and the value of which depends upon both the information in the message and information representing the identity of the sender, and wherein the authentication code is produced by a method comprising the steps of: computing within the terminal apparatus by first processing means a first code the value of which depends upon the information within the message and comprising substantially fewer data bits than in said message; issuing that code to the sender; computing a second code from said first code and from information representing the identity of the sender, said second code comprising substantially fewer data bits than in said message, by second processing means within a token assigned to the sender and which means can be actuated to perform the computation of said second code only upon recognition of a correct input indicative of the authority of the sender; and entering said code into the terminal apparatus, that code or a derivative thereof constituting the authentication code; and which comprises at the receiving station repeating the computation of an authentication code from the received message by means replicating the computations of said first and said second processing means, and comparing the authentication code thus computed with the authentication code received, thereby to permit authentication of the received message and of the identity of the sender.

2. A method according to claim 1 wherein the computation of said first and second codes is dependent upon respective cryptographic keys held in the terminal apparatus and token, the same keys being held at the receiving station.

3. A method according to claim 2 wherein the cryptographic key held in the token is unique for each individual token in the system and thus represents the identity of the corresponding sender.

4. A method according to claim 1 wherein the token is portable and in use completely structurally separate from the terminal apparatus.

5. A method according to claim 1 wherein the token can be activated to perform the computation of said second code upon the recognition of a correct sender's personal identification number inputted to it.

6. A method according to claim 1 wherein the token can be activated to perform the computation of said second code upon the recognition of a correct sender's biometric parameter inputted to it.

7. A method according to claim 1 wherein said first code is also appended to the message to be transmitted.

8. Apparatus for secure message transmission to a remote receiving station in a communications system, by a method which involves appending to a message to be transmitted an authentication code comprising substantially fewer data bits than in the message and the value of which depends upon both the information in the message and information representing the identity of the sender, comprising: a terminal apparatus having first processing means adapted to compute a first code the value of which depends upon the information within the message and means to issue that code to the sender, said first code comprising substantially fewer data bits than in said message; and a token assigned to the sender having second processing means adapted to compute a second code from said first code and from information representing the identity of the sender, said second code comprising substantially fewer data bits than in said message, and which second processing means can be activated to perform the computation of said second code only upon recognition of a correct input indicative of the authority of the sender; the terminal apparatus also being adapted to receive said second code and appended that code or a derivative thereof to the message as said authentication code; and the receiving station having means adapted to replicate the computations of said first and second processing means for repeating the computation of an authentication code from the received message and means for comparing that code with the authentication code received, thereby to permit authentication of the received message and of the identity of the sender.

* * * * *